US006874960B2

(12) United States Patent
Daoud

(10) Patent No.: US 6,874,960 B2
(45) Date of Patent: Apr. 5, 2005

(54) KEYBOARD

(76) Inventor: Deeb Daoud, 16a Anilevitch St., Haifa 35025 (IL)

( * ) Notice: Subject to any disclaimer, the term of this patent is extended or adjusted under 35 U.S.C. 154(b) by 0 days.

(21) Appl. No.: 10/043,711

(22) Filed: Jan. 9, 2002

(65) Prior Publication Data

US 2003/0035674 A1 Feb. 20, 2003

Related U.S. Application Data

(63) Continuation-in-part of application No. 09/329,149, filed on Jun. 9, 1999, now abandoned.

(51) Int. Cl.[7] .................................................. B41J 5/00
(52) U.S. Cl. ....................... 400/484; 400/472; 400/486
(58) Field of Search .............................. 400/472, 491.3, 400/487; 341/21, 22, 484, 486

(56) References Cited

U.S. PATENT DOCUMENTS

| 4,310,753 A | * | 1/1982 | Fischer .................... 235/145 R |
| 4,715,736 A | * | 12/1987 | McGunnigle ................ 400/484 |
| 5,307,267 A | * | 4/1994 | Yang ......................... 715/535 |
| 5,387,042 A | * | 2/1995 | Brown ........................ 400/477 |
| 5,634,134 A | * | 5/1997 | Kumai et al. ............... 707/536 |
| 5,667,319 A | * | 9/1997 | Satloff ........................ 400/472 |

FOREIGN PATENT DOCUMENTS

| GB | 2 243 704 A | * | 6/1991 | .......... H03M/11/00 |
| JP | 59-041038 | * | 3/1984 | ............. G06F/3/02 |

* cited by examiner

*Primary Examiner*—Andrew H. Hirshfeld
*Assistant Examiner*—Dave A. Ghatt
(74) *Attorney, Agent, or Firm*—William H. Dippert; Reed Smith LLP

(57) ABSTRACT

The present invention provides a keyboard that comprises a plurality of touch areas that represent symbols such as letters of the Latin script, Greek script, Hebrew script, Arabic script, or Cyrillic script. The touch areas are arranged in groups that include at least two of the touch areas. Each of the groups includes touch areas that are arranged in a distinctive shape that incorporates one or more of the symbols or parts of the symbols. A user enters a symbol by touching a part of the distinctive shape that is recognized with the symbol.

10 Claims, 5 Drawing Sheets a b c d e f (i)                                         (ii)

KEYBOARD

The present application is a continuation-in-part of the regular application Ser. No. 09/329,149 filed on Jun. 9, 1999 by Daoud D., now abandoned.

FIELD OF THE INVENTION

The present invention relates to keyboards. More particularly, the present invention relates to an alternative keyboard to be used for computers, cell phones, other data input electronic devices and the like.

BACKGROUND OF THE INVENTION

Keyboards connected to data input electronic devices and the like are usually provided with touch areas through which the data is transferred. In the following text, the term "touch area" will be referred to any uncovered or covered key or a button having any shape and size that is pressed in order to transfer a signal corresponding to letters, numbers and other symbols. The touch areas are adapted to close an electrical circuit when they are touched or pressed so as to transfer electronic signals from the keyboard to the electronic device. Every touch area transfers a signal that represents a certain character, number or symbol. Keyboards are well known in the art.

Usually, the keys of the keyboard are provided with an indication of the symbol so as to connect the key to the symbol. There are available keyboards, especially for children, in which the keys has a certain shape or a drawing is provided on them that corresponds the signal. An example is disclosed in U.S. Pat. No. 5,667,319 "Simplified Computer Keyboard" by Satloff filed in 1995. This keyboard is arranged for the use of a child. The simplified keyboard arrangement has a matrix of keys that are so situated to facilitate interaction between a child and a device such as a computer.

The size of the keyboard is usually determined by the number of symbols (letters, numbers, functions) on the keyboard and the number of groups of symbols. There is a need to provide keyboards or active surfaces in which the touch areas are arranged in a compact layout so as to enable all data entry capabilities to be presented on a relatively small surface. A wide spectrum of electronic devices is constantly turning up as terminals of computerized environment such as cyberspace, d-entertainment in general and d-TV in particular, pagers and other communication devices. Smaller keyboards or active surfaces are especially needed for portable electronic devices such as cell phones, laptops, or remote controls.

Physical limitations and the need for smaller keyboards brought about several solutions for data entry. A very popular solution is applied in cell phones, which are portable and relatively small.

An erstwhile solution is applied in almost all available computer keyboards in which the touch areas are arranged in a standard order referred to as QWERTY. In those keyboards, which require a relatively sizable activating surface, the use of two touch areas combined together is used in order to reduce the number of touch areas. In the English language, for example, the upper case letters are typed by clicking the letter's key while the shift key is held down or the Caps Lock key is activated. In this way, two sets of letters, upper case and lower case, are activated through one set of touch areas. However, the classical QWERTY configuration is not compatible with devices having a small surface for data entry such as cell phones due to size and uncomfortable hand and fingers movement and position.

Alternatives for keyboards such as handwriting recognition (HWR) and voice recognition (VR) were found to be inadequate. HWR is relatively slow even when backed up by sophisticated "heavy" algorithms. "Light" algorithms in personal digital assistants (PDA) cannot handle HWR, hence lack the ability to achieve accurate data entry. Moreover, the best HWR solutions still suffer from up to 10% mistakes, especially encountered during real and fast handwriting. Similar limitations are associated with VR. There are inaccuracies in recognition during fast dictation or changes in dictating voice. VR is especially prone to environmental artifacts such as noise, radio, traffic, loudspeakers, air-conditioning and more.

A solution for compact keyboards is applied currently in available cell phones. A few letters are introduced in each of the numerical touch areas. However, several clicks on a touch area are needed in order to choose some of the letters. It has been shown that a massage of 143 characters length needs 366 strikes on touch areas ("Cellular users refuse to click" by Hadar Horesh, Ha'aretz (daily magazine, Israel) Feb. 25, 2001 pp G4). This is still cumbersome and time consuming.

A more recent solution for decreasing the surface of the touch areas is Tegic T9 technology for phone keyboards. This technology provides free key tapping, where desired letter is typed by pressing the key that stands for it, regardless its order among other letters appearing on the same key. Resultant letters are simply a consecutive sequence of those letters coming first in the order on pressed keys (e.g., consecutive 7663 represents PMMD). After pressing the space bar, T9 software identifies intended word or words based on the provided algorithm (7663"space bar" stands for two equivalent words: SOME and ROOF). After several words that are equivalents of the pressed keys combination appear, the user should scroll over them and pick up the desired word. Until the final word is obtained, the user remains a victim of doubts and non-confidence of what will be turned out finally. Moreover, entry of a part of a word is impossible through T9 technology. The use of T9 technology is cumbersome and difficult in entry and retrieval of data.

To conclude, it seems that the available solutions for touch areas layout in small devices is still inadequate, not compatible or cumbersome for users. There is a need to provide another arrangement of letters that will make the keyboard friendlier to the user and more comfortable.

SUMMARY OF THE INVENTION

It is an object of the present invention to provide a new and unique keyboard arrangement in which the touch areas are ordered in grouped and shaped layout so as to facilitate the user to recognize the letters.

It is another object of the present invention to provide a new and unique keyboard arrangement that can be ordered on a relatively small surface.

It is yet another object of the present invention to provide a new and unique keyboard arrangement in which the touch areas are ordered according to groups of letters. Each group of letters is ordered in a distinctive shape built up from the shapes of a few letters incorporated into a total shape. Each part of the distinctive shape resembles one letter or a part of a letter in the group so that a touch of this part of the total shape produces an electrical signal corresponding the letter represented in the distinctive shape.

It is thus provided a keyboard comprising a plurality of touch areas, wherein each of the touch areas represents a symbol from a plurality of symbols, and wherein the touch areas are arranged in at least one of a plurality of groups each group including at least two of the touch areas, wherein each of the groups includes touch areas that are arranged in a distinctive shape that incorporates one or more of the symbols or part of the symbols, whereby a user enters a symbol by touching a part of the distinctive shape that is recognized with the symbol.

Furthermore, in accordance with another preferred embodiment of the present invention, the touch areas are keys.

Furthermore, in accordance with another preferred embodiment of the present invention, the symbols are Latin letters.

Furthermore, in accordance with another preferred embodiment of the present invention, the symbols are Hebrew letters.

Furthermore, in accordance with another preferred embodiment of the present invention, the symbols are Arabic letters.

Furthermore, in accordance with another preferred embodiment of the present invention, the symbols are Cyrillic letters.

Furthermore, in accordance with another preferred embodiment of the present invention, the symbols are Greek letters.

Furthermore, in accordance with another embodiment of the present invention, touch areas are flat plates.

Furthermore, in accordance with another preferred embodiment of the present invention, each of the flat plates is provided with a groove that is adapted to receive a pointer, wherein symbols are entered using the pointer.

Finally, in accordance with another preferred embodiment of the present invention, said keyboard is adapted to activate one of a group of electronic devices such as wireless phones, handheld computers (Palm, Visor, Casiopeia, Helio and more), MP3 devices, interactive remote controls, two-way pagers, automobile PCs, navigational computers, data loggers, assistance technology devices, electronic games, graphic pads.

DETAILED DESCRIPTION OF THE INVENTION AND FIGURES

Figure 1:
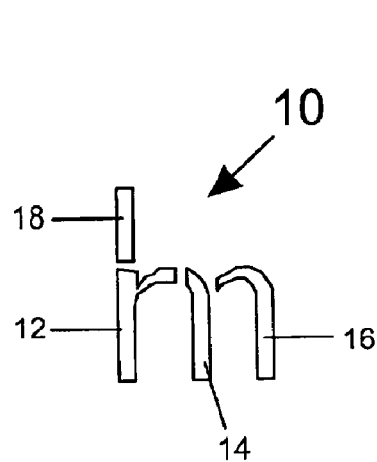
FIGS. 1a–f illustrates six Latin master letters (ML) for keyboard in accordance with a preferred embodiment of the present invention.
Figure 1:
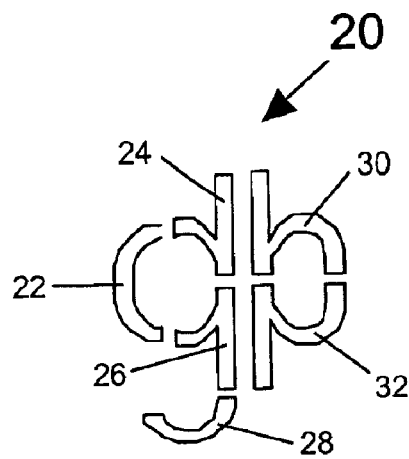
Figure 1:
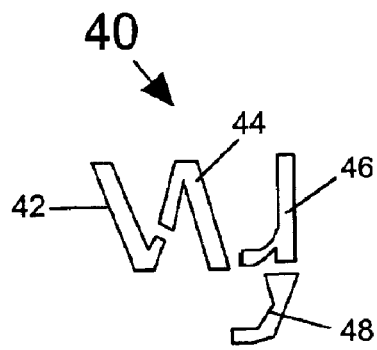
Figure 1:
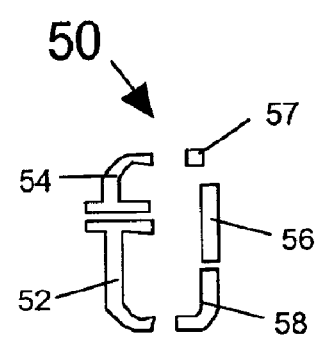
Figure 1:
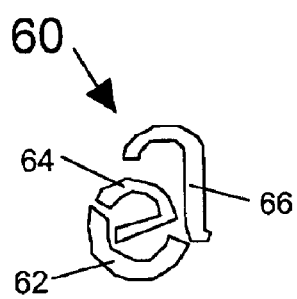
Figure 1:
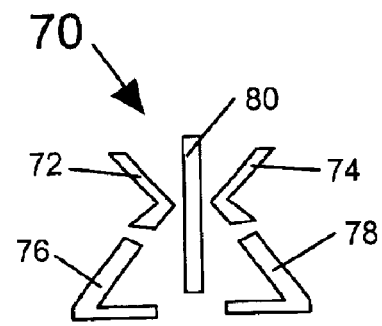

The present invention provides a new and unique compact alphanumeric data entry device to be used in communication devices, such as: wireless phones, handheld computers (Palm, Visor, Casiopeia, Newton, Helio and more), microcomputers, MP3 devices, interactive remote controls, two-way pagers, automobile PCs, navigational computers, data loggers, assistance technology devices, electronic games, graphic pads and more. The present invention is based on incorporating several letters or symbols into one master letter (ML). ML usually comprises several letters that have a certain similarity in their shape. One of the novelties of the present invention is the use of touch areas that are shaped in an appearance that resembles letters or part of the letters.

Reference is now made to FIGS. 1a to f, illustrating six Latin master letters (ML) for keyboard in accordance with a preferred embodiment of the present invention.

FIG. 1a illustrates ML 10 that comprises four Latin letters: r, n, h and m, represented by their lower case. Each separated part of ML 10 represents a letter from this group in the following manner. Pressing a first part 12 generates the letter r. First part 12 is identical in shape to the actual shape of the lower case of the letter r so that the user identifies the letter r from viewing ML 10. Second part 14 complements first part 12 to the lower case of the letter n. Pressing second part 14 generates the letter n. Third part 16 complements the n letter so as to establish the letter m. Fourth part 18 complements first part 12 and second part 14 to the letter h.

As can be seen, the built up of the four letters into a master letter ML 10 is based on the fact that the letters resembles each other in some of their parts and differ from each other in other parts. For example, the h letter has a part that is identical to r and a part that is identical to n and a distinctive part on the top of the letter that is identified solely with the h letter. Therefore, a touch on this distinctive part will generate the letter h. The user, which identifies the letters and bears them in mind, identifies each of the distinctive parts or the letters and their common parts. Due to the resemblance of the letters, their distinction, and the fact that the human mind is adapted to identify known patterns, a reasonable user learns to use the master letter after a very short tutoring. The ability of the human mind to identify patterns facilitates the user to identify each of the letter that produces a ML.

Reference is now made to FIG. 1b illustrating another Latin master letter for a keyboard in accordance with a preferred embodiment of the present invention. ML 20 comprises 6 letters: c, d, b, q, p and g. Similarly to ML 10, each part of the ML completes a known pattern of a letter. A first part 22 resembles the letter c. Pressing first part 22 establishes the letter c. A second part 24 and a third part 26 combines with first part 22 complements a circle having two protruding lines on the circle's right side. Both the letters d and q have a circle and a protruded line, the line of the d letter protrudes upwardly and the line of the letter q protrudes downwards. Pressing second part 24, which has a distinctive part that upwardly protrudes, establishes the letter d, while pressing third part 26 having a distinctive line protruding downwards establishes the letter q. An addition of a fourth part 28 complements the letter q so it becomes g.

Pressing fourth part 28 generates g. Similar characteristics that distinguish d from q distinguish b from p, however, the protruding lines are on the left side of the circle. Fifth part 30 and sixth part 32 forms together a combined b and p. Pressing fifth part 30, which has an upwardly protruding line, generates the letter b, and pressing sixth part 32, which has a downwards protruding line, generates p.

In FIG. 1c, another ML is illustrated. ML 40 comprises four letters: v, w, u and y. Again, those letters are provided with parts that may be incorporated so as to establish the ML. First part 42 has distinctive parts of v and pressing this part generates the v letter. A second part 44 complements part 42 to establish almost full w. Pressing second part 44 will generate the w letter. Third part 46 has a portion of the letter u so that pressing it will generate the u letter and fourth part 48 has a distinctive downwards-protruding portion of the y letter.

In FIG. 1d, another ML is illustrated. ML 50 comprises of f, t, i, and j. First part 52 resembles the letter t so that pressing first part 52 generates the letter t. The f letter is represented by second part 54. Third part 56 with un-activated part 57 resembles the letter i and fourth part 58 complements third part 56 to the letter j. Pressing third part 56 generates i and pressing fourth part 58 generates the letter j.

FIG. 1e illustrates ML 60. ML 60 comprises three letters: o, e, and a. First part 62 is a part of a circle that is a part of the letter o. Second part 64 is a distinctive part of the letter e, and third part 66 represent a part of the letter a.

FIG. 1f illustrates ML 70 that comprises the letters x, z, l, k, and s. Each part of ML 70 represents a portion of the letter that distinguishes it from the other letters. First part 72 represents a part of the letter x, while on the other side the letter k is represented by second part 74. The letter z is represented by third part 76 and the letter s by the other side in fourth part 78. The line in fifth part 80 represents the letter l.

Table 1 summarizes the master letters in Latin. The number of letters integrated in each master letter is stated as well as the letters themselves. 26 letters of the Latin language are incorporated in six master letters.

TABLE 1

| Master Letter | No. of incorporated letters | Incorporated letters |
| --- | --- | --- |
|  | 4 | r n h m |
|  | 4 | v w u y |
|  | 6 | c d b q p g |
|  | 3 | o e a |
|  | 5 | x z l k s |
|  | 4 | f t I j |
| Total | 26 | Latin letters |

The letters of the Latin language may be incorporated in another format using different master letters, not necessarily six master letters. In addition, the method can be applied to any other language. Any format of master letters that integrate letters of a language is covered by the scope of the present invention. Other signs and symbols may be intergrated in the same manner.

A significant advantage of using master letters incorporating a number of letters is the ability to keep the letters relatively large and readable on a relatively small area.

Figure 2:
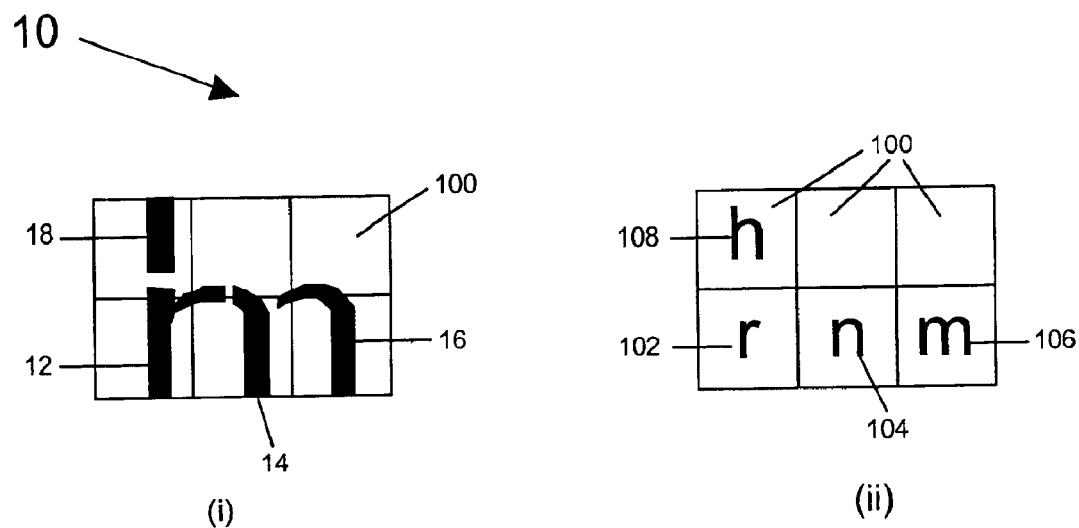
FIG. 2 illustrates the size of a master letter incorporating four letters in accordance with a preferred embodiment of the present invention (i) versus the size of the four letters arranged in a conventional manner (ii).

Reference is now made to FIG. 2 illustrating the size of a master letter incorporating four letters in accordance with a preferred embodiment of the present invention (i) versus the size of the four letters arranged in a conventional manner (ii). In FIG. 2(i), the ML referred to as ML 10 in FIG. 1, is illustrated. ML 10 represents four integrated letters, which are r, n, m and h. FIG. 2(ii) represents the same four letters arranged in a conventional manner on four keys 100 or touch areas. Each letter is written on one of keys 100. The representation of each of the written letters has to be slightly smaller than the key itself. On the other hand, ML 10 is as large as the space occupied by all four keys 100. First part 12 corresponds to the r key 102. Second part 14 corresponds to the n key 104. Third part 16 corresponds to the m key 106. Fourth part 18 corresponds to the h key 108. The area occupied by the indication of ML 10 is as large or larger than the area occupied by four touch areas, while the area occupied by a standard indication is smaller that a standard key or touch area. Therefore, the indicating symbol of the h letter, for example, includes the touch areas of the h, r and n letters. This feature forms an h symbol that is much larger than the touch area devoted to the h letter. This is a new and unique characteristic that is presented for the first time in the present invention. This is opposed to any existing letter indications on keys or touch areas of available keyboards.

In order to better understand the potential of touch areas minimization, lets focus, for example, on the size of the letter m in both figures (i) and (ii). In FIG. 2(ii), the conventional m key is represented by the mark m that has a natural shape and size that adapt the size of the key. In FIG. 2(i), the letter m is marked by first part 12, second part 14 and third part 16. The letter m in ML 10 is at least 3 fold larger than the letter m on the conventional key. Therefore, ML 10 may be reduced in size to substantially the same size as one conventional key and still be in the same size as the conventional m. However, the m letter according to the present invention has touch areas of three letters: r, n and m while the conventional m occupies only one letter.

Figure 3:
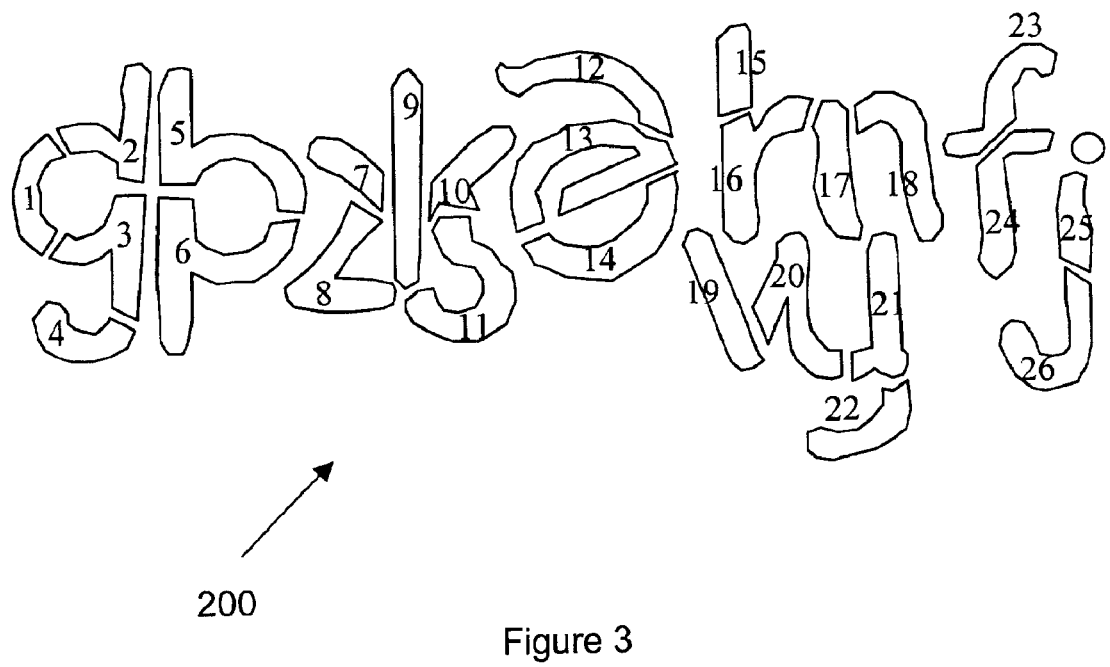
FIG. 3 illustrates a keyboard layout of 26 Latin letters in accordance with a preferred embodiment of the present invention.

Reference is now made to FIG. 3 illustrating a keyboard layout of 26 Latin letters in accordance with a preferred embodiment of the present invention. Layout 200 comprises all six master letters shown in FIG. 1, ordered in a compact arrangement. Each part is marked by a number solely for showing the 26 letters of the Latin language. It can be clearly seen that the Latin letters can be identified only by a glance on layout 200, even for a person that is not accustomed with the layout of the present invention. A very short tutoring of the method will facilitate a user to use the layout of the present invention freely.

Each part of layout 200 that is marked by a number represents a letter from the Latin language. Each part is a touch area that generates a letter. A few examples: a press on touch area number 9 generates l; a press of touch area 19 generates v; a press on touch area 23 generates f; a press on touch area 22 generates y; a press on touch area 6 generates the letter p and so on. Almost all touch areas are represented by a distinctive part of the ML that is incorporated from a few touch areas. As mentioned already, the human mind is adapted to think in known patterns, therefore, a glance on the layout generates recognition of the letters. The confirmation of the typed letter is immediate.

Table 2 summarizes the letter represented by each part of the master letters in the Latin script as represented by layout 200.

TABLE 2

| Number | Letter | Number | Letter |
|---|---|---|---|
| 1 | c | 14 | o |
| 2 | d | 15 | h |
| 3 | q | 16 | r |
| 4 | g | 17 | n |
| 5 | b | 18 | m |
| 6 | p | 19 | v |
| 7 | x | 20 | w |
| 8 | z | 21 | u |
| 9 | l | 22 | y |
| 10 | k | 23 | f |
| 11 | s | 24 | t |
| 12 | a | 25 | i |
| 13 | e | 26 | j |

Another feature of the layout of the present invention is the shape of the touch area. If the layout of the present invention is produced in keys that are shaped as the letters and protrudes slightly from the surface of the keyboard, the layout may be useful also for blind people. This eliminates the need to produce a special Braille device for the blind.

The ability to compactly order all letters together facilitates in producing an ergonomic keyboard since all script letters are easy to access. Only a slight move of the fingers suffice in order to move from one letter to another.

Layout 200 may be generated in various sizes. However, when the touch areas become very small in size, it is very uncomfortable to touch the keys with the fingers. A pointer is an adequate solution for pressing or touching a touch area in accordance with the present invention.

Figure 4:
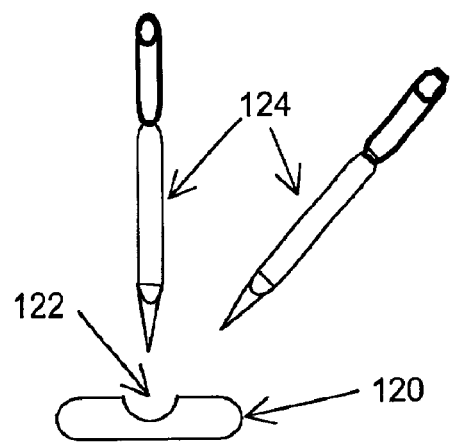
FIGS. 4a, b illustrates cross sectional views of a keyboard in the ML plate in accordance with a preferred embodiment of the present invention, provided with a pointer approaching the touch area from two different directions.

Reference is now made to FIGS. 4a and b illustrating cross sectional views of a keyboard in the ML plate in accordance with preferred embodiments of the present invention, provided with a pointer approaching the touch area from two different directions. The touch area 120 of a ML such as the ones shown in the above embodiments of the present invention is provided with a groove 122 so as to facilitate the accuracy of touching a specific part of the ML. Groove 122 is adapted to receive the tip of a pointer 124 so that the pointer touches a specific point of the desired part of the ML, which represents and generates a certain letter. Grooves 122 also facilitates accuracy of pointing a certain part of the ML since the pointer may approach the touch area from different directions as illustrated in the left and in the right illustrations and touch the correct point. The groove prevents the pointer from slipping.

Each ML's touch area is provided with several grooves. Each groove signals and generates one letter from the integrated letters of the ML. The grooves are well separated from one another so that no mistakes are generated due to insufficient resolution between the integrated letters.

Figure 5:
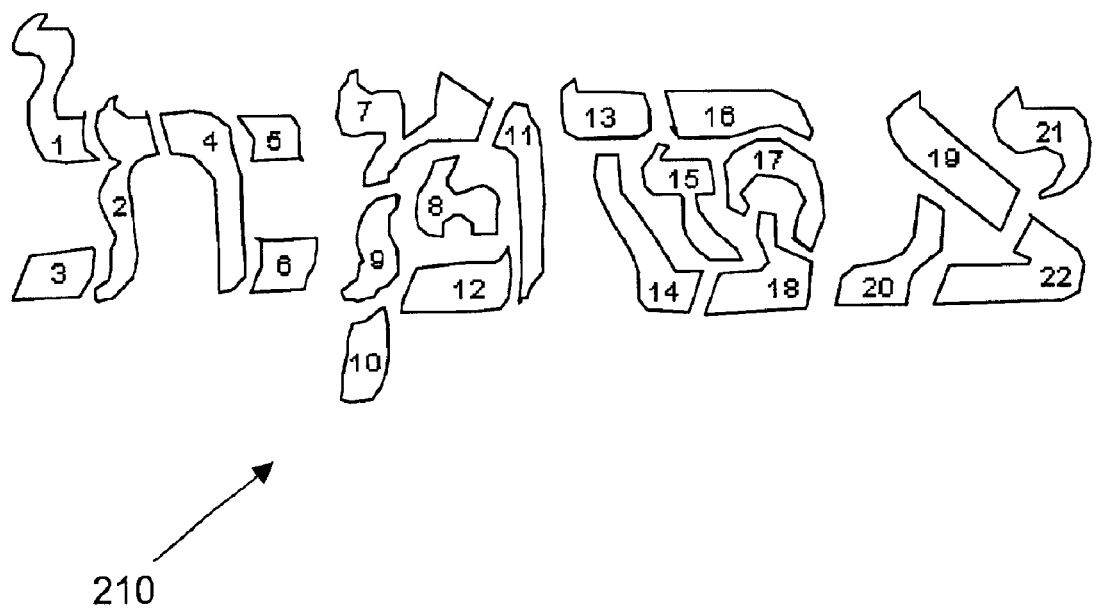
FIG. 5 illustrates a layout of Hebrew script in accordance with a preferred embodiment of the present invention.

Reference is now made to FIG. 5 illustrating a layout of Hebrew script in accordance with a preferred embodiment of the present invention. The Hebrew layout 210 comprises four master letters which parts are indicated by numbers. Each number represents a letter from the Hebrew script as summarized in Table number 3.

TABLE 3

| Number | Letter | Number | Letter |
|---|---|---|---|
| 1 | י | 12 | כ |
| 2 | ח | 13 | ז |
| 3 | ת | 14 | ש |
| 4 | ר | 15 | ע |
| 5 | ד | 16 | ס |
| 6 | ב | 17 | ט |
| 7 | ה | 18 | ן |
| 8 | פ | 19 | א |
| 9 | ה | 20 | ג |
| 10 | ק | 21 | ו |
| 11 | ו | 22 | צ |

Figure 6:
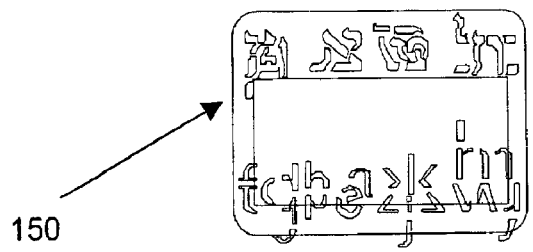
FIG. 6 illustrates a layout of two scripts, a Latin script and a Hebrew script, in accordance with another preferred embodiment of the present invention, ordered so that both scripts reside on the same keyboard surface.

Reference is now made to FIG. 6 illustrating a layout of two scripts, a Latin script and a Hebrew script, in accordance with another preferred embodiment of the present invention, ordered so that both scripts reside on the same keyboard surface Both scripts are positioned on the same screen 150. This layout is adapted to be positioned conveniently and readably on screen 150 that can be of a cell phone such as Motorola-Startac screen, which is relatively small. Moreover on a Nokia 9110 keypad, even four scripts can reside together. Screen 150 is provided with an upper Latin layout and a lower Hebrew layout.

The Latin and the Hebrew scripts may be both in a different layout or be laid with other scripts or any other combination, and still be covered by the scope of the present invention.

Figure 7:
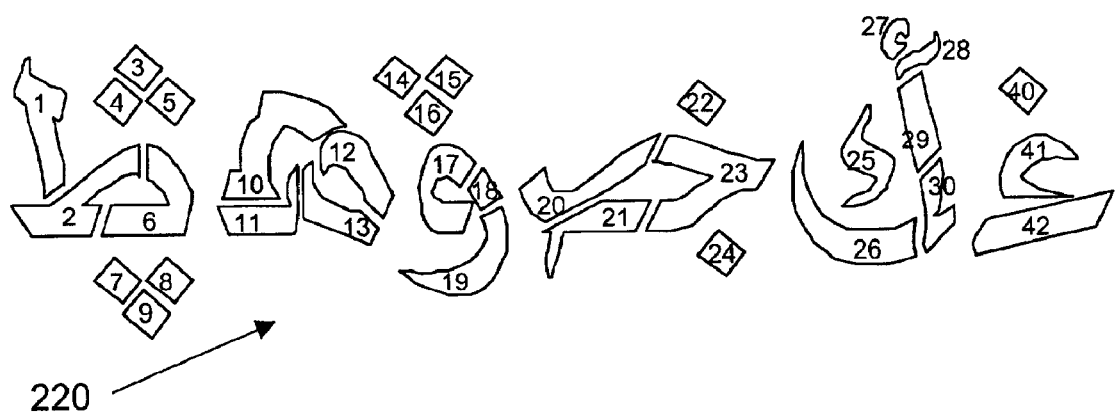
FIG. 7 illustrates a layout of Arabic script in accordance with a preferred embodiment of the present invention.

Reference is now made to FIG. 7 illustrating a layout of Arabic script in accordance with a preferred embodiment of the present invention. Arabic script 220 comprises six MLs that are arranged in parts, each part represents a letter of the Arabic script. The parts are numbered and the corresponding letters are summarized in Table 4.

TABLE 4

| Number | Letter | Number | Letter | Number | Letter |
|---|---|---|---|---|---|
| 1 | ط | 12 | س | 23 | ح |
| 2 | ظ | 13 | ش | 24 | خ |
| 3 | ث | 14 | ق | 25 | ك |
| 4 | ت | 15 | ف | 26 | ل |
| 5 | ة | 16 | ن | 27 | ا |
| 6 | ى | 17 | و | 28 | ز |
| 7 | ي | 18 | ز | 29 | ا |
| 8 | ب | 19 | ر | 30 | ا |
| 9 | ب | 20 | ض | 31 | إ |
| 10 | ه | 21 | ص | 32 | ع |
| 11 | ش | 22 | غ | 33 | ، |

Figure 8:
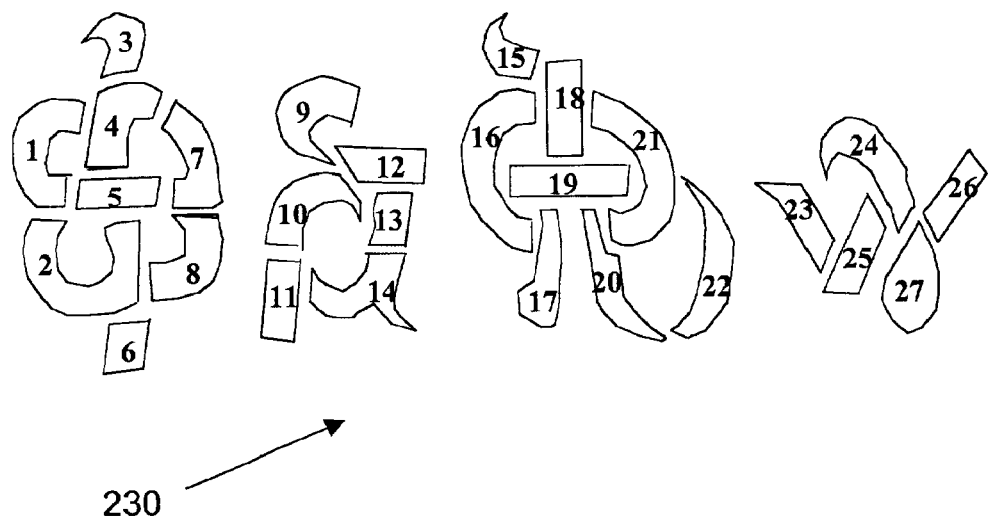
FIG. 8 illustrates a layout of Greek script in accordance with a preferred embodiment of the present invention.

Reference is now made to FIG. 8 illustrating a layout of Greek script in accordance with a preferred embodiment of the present invention. Greek script 230 comprises four MLs that are arranged in parts each part represents a letter of the Greek script. The parts are numbered and the corresponding letters are summarized in Table 5.

TABLE 5

| Number | Small letter | Capital letter | Number | Small letter | Capital letter |
|---|---|---|---|---|---|
| 1 | ε | E | 15 | ξ | Ξ |
| 2 | ω | Ω | 16 | ζ | Z |
| 3 | η | H | 17 | π | Π |

TABLE 5-continued

| Number | Small letter | Capital letter | Number | Small letter | Capital letter |
|---|---|---|---|---|---|
| 4 | ϕ | ∂ | 18 | φ | Φ |
| 5 | θ | Θ | 19 | τ | T |
| 6 | ψ | Ψ | 20 | ι | I |
| 7 | э | э | 21 | o | O |
| 8 | ϖ | ς | 22 | υ | Y |
| 9 | δ | Δ | 23 | ν | N |
| 10 | β | B | 24 | χ | X |
| 11 | ρ | P | 25 | λ | Λ |
| 12 | σ | Σ | 26 | κ | K |
| 13 | α | A | 27 | γ | Γ |
| 14 | μ | M | | | |

Figure 9:
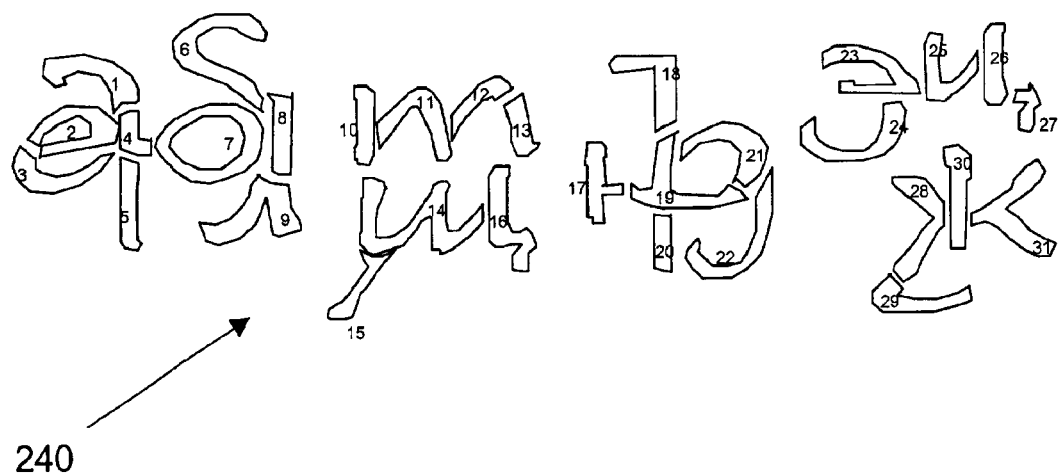
FIG. 9 illustrates a layout of Cyrillic script in accordance with a preferred embodiment of the present invention.

Reference is now made to FIG. 9 illustrating a layout of Cyrillic script in accordance with a preferred embodiment of the present invention. Cyrillic script 240 comprises four MLs that are arranged in parts, each part represents a letter of the Cyrillic script. The parts are numbered and the corresponding letters are summarized in Table 6.

TABLE 6

| No. | Small | Capital | No. | Small | Capital | No. | Small | Capital |
|---|---|---|---|---|---|---|---|---|
| 1 | f | F | 12 | v | V | 22 | l | L |
| 2 | t | T | 13 | n | N | 23 | ' | " |
| 3 | c | C | 14 | i | I | 24 | p | P |
| 4 | / | ? | 15 | e | E | 25 | b | B |
| 5 | a | A | 16 | o | O | 26 | x | X |
| 6 | , | < | 17 | y | Y | 27 | w | W |
| 7 | j | J | 18 | ) | ) | 28 | [ | { |
| 8 | s | | 19 | M | M | 29 | u | U |
| 9 | z | Z | 20 | h | H | 30 | ; | : |
| 10 | g | G | 21 | d | D | 31 | r | R |
| 11 | k | K | 21 | d | D | | | |

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

What is claimed is:

1. A keyboard for inputting characters from character sets, the keyboard comprising a plurality of touch areas arranged in groups, each group bearing a specific character set, wherein each character set is in the form of a master letter, each character set including a plurality of parts, said each part being at least a portion of the graphical representation of a character, each part assigned to a touch area, wherein each touch area corresponds to a character from the specific character set and is aimed at solely inputting that character.

2. The keyboard as claimed in claim 1, wherein the touch areas are keys.

3. The keyboard as claimed in claim 1, wherein the character sets comprise Latin letters.

4. The keyboard as claimed in claim 1, wherein the character sets comprise Hebrew letters.

5. The keyboard as claimed in claim 1, wherein the character sets comprise Arabic letters.

6. The keyboard as claimed in claim 1, wherein the character sets comprise Cyrillic letters.

7. The keyboard as claimed in claim 1, wherein the character sets comprise Greek letters.

8. The keyboard as claimed in claim 1, wherein touch areas are flat plates.

9. The keyboard as claimed in claim 8, wherein each of the flat plates is provided with a groove that is adapted to receive a pointer, wherein characters are entered using the pointer.

10. The keyboard as claimed in claim 1, wherein said keyboard is adapted to activate a electronic device selected from the group consisting of wireless phones, handheld computers, MP3 playing devices, interactive remote controls, two-way pagers, automobile PCs, navigational computers, data loggers, assistance technology devices, electronic games, and graphic pads.

* * * * *